(12) United States Patent
Ide

(10) Patent No.: US 10,871,656 B2
(45) Date of Patent: Dec. 22, 2020

(54) BEAM DIAMETER EXPANDING DEVICE AND DISPLAY DEVICE

(71) Applicant: SEIKO EPSON CORPORATION, Tokyo (JP)

(72) Inventor: Mitsutaka Ide, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 428 days.

(21) Appl. No.: 15/696,739

(22) Filed: Sep. 6, 2017

(65) Prior Publication Data

US 2018/0088342 A1 Mar. 29, 2018

(30) Foreign Application Priority Data

Sep. 26, 2016 (JP) ................................ 2016-186600

(51) Int. Cl.
*G03H 1/00* (2006.01)
*G02B 27/09* (2006.01)
*G02B 6/02* (2006.01)
*G02B 6/12* (2006.01)
*F21V 8/00* (2006.01)
(Continued)

(52) U.S. Cl.
CPC ....... *G02B 27/0977* (2013.01); *G02B 6/0031* (2013.01); *G02B 6/02066* (2013.01);
(Continued)

(58) Field of Classification Search
CPC ............ G02B 27/0977; G02B 27/0905; G02B 27/1093; G02B 27/148; G02B 27/0081;
(Continued)

(56) References Cited

U.S. PATENT DOCUMENTS

| | | | | |
|---|---|---|---|---|
| 2011/0013245 A1* | 1/2011 | Tanaka | ................. | G02B 26/105 359/201.2 |
| 2011/0102874 A1* | 5/2011 | Sugiyama | ............ | G02B 26/101 359/205.1 |

(Continued)

FOREIGN PATENT DOCUMENTS

| | | | | |
|---|---|---|---|---|
| JP | 2005352038 A | * | 12/2005 | ............... G02B 5/04 |
| JP | 2014-059395 A | | 4/2014 | |

(Continued)

*Primary Examiner* — Stephone B Allen
*Assistant Examiner* — Jyotsna V Dabbi
(74) *Attorney, Agent, or Firm* — Oliff PLC

(57) ABSTRACT

A beam diameter expanding device includes a first optical element and a second optical element. The first optical element expands a beam diameter of a light beam entering through a first incident face by expanding in a first direction, and emits the expanded light beam from a first emission face. The second optical element expands a beam diameter of the light beam that entered through a second incident face in a state expanded in beam diameter in the first direction by the first optical element, by expanding in a second direction, and emits the expanded light beam from a second emission face. A width of the first incident face in the second direction (the direction of beam diameter expansion by the second optical element) is narrower than a width of the second incident face in the first direction (the direction of beam diameter expansion by the first optical element).

20 Claims, 6 Drawing Sheets

(51) Int. Cl.
*G02B 27/10* (2006.01)
*G02B 27/14* (2006.01)
*G02B 27/00* (2006.01)
*G02B 27/01* (2006.01)

(52) U.S. Cl.
CPC ..... *G02B 6/12004* (2013.01); *G02B 27/0081* (2013.01); *G02B 27/0172* (2013.01); *G02B 27/0905* (2013.01); *G02B 27/1093* (2013.01); *G02B 27/148* (2013.01)

(58) Field of Classification Search
CPC .. G02B 27/0172; G02B 27/017; G02B 27/01; G02B 27/14; G02B 27/10; G02B 27/144; G02B 27/145; G02B 27/09; G02B 6/02066; G02B 6/12004; G02B 6/0031; G02B 6/00; G02B 6/0011; G02B 6/0023; G02B 6/0013; G02B 6/10; G02B 19/0052; G02B 19/0061; H01S 3/005
USPC .......................................................... 359/13
See application file for complete search history.

(56) References Cited

U.S. PATENT DOCUMENTS

| | | | |
|---|---|---|---|
| 2012/0062998 A1* | 3/2012 | Schultz | B29D 11/00663 359/630 |
| 2013/0314789 A1* | 11/2013 | Saarikko | G02B 27/0081 359/489.07 |
| 2014/0078592 A1 | 3/2014 | Hotta et al. | |
| 2015/0277124 A1 | 10/2015 | Ide et al. | |
| 2015/0279114 A1 | 10/2015 | Yonekubo | |
| 2016/0124226 A1 | 5/2016 | Ide et al. | |
| 2016/0124232 A1 | 5/2016 | Ide et al. | |
| 2016/0370693 A1* | 12/2016 | Watanabe | G03B 21/14 |

FOREIGN PATENT DOCUMENTS

| | | |
|---|---|---|
| JP | 2015-191026 A | 11/2015 |
| JP | 2015-191103 A | 11/2015 |
| JP | 2016-090801 A | 5/2016 |
| JP | 2016-090802 A | 5/2016 |
| JP | 2016-186605 A | 10/2016 |

* cited by examiner

BEAM DIAMETER EXPANDING DEVICE AND DISPLAY DEVICE

BACKGROUND

1. Technical Field

The present disclosure relates to a beam diameter expanding device, and to a display device.

2. Related Art

In a retinal scanning type of display device in which an optically modulated light beam is made incident on an eye of a user, if the beam diameter of a light beam is small, then occluded portions of an image and the like appear due to the light beam not entering a pupil when the position of the pupil has changed. Thus in retinal scanning type display devices, there is accordingly technology proposed to expand the beam diameter in two directions intersecting each other by changing the orientation of two optical elements (a first optical element and a second optical element) each capable of expanding a beam diameter in a single direction (see JP-A-2016-90802). In the beam diameter expanding device described in JP-A-2016-90802, each of the first optical element and the second optical element has a stacked layer structure of alternately stacked light-transmissive layers and partially reflective layers. The beam diameter is expanded in the stacking direction of the light-transmissive layers and the partially reflective layers.

A retinal scanning type of display device needs to be made more compact and reduced in weight in order to be mounted on a head or the like. However, the technology described in JP-A-2016-90802 does not include countermeasures to make a beam diameter expanding device compact and light-weight enough to the minimum extent required.

SUMMARY

An advantage of some aspects of the embodiment is provision of a beam diameter expanding device, and a display device, capable of achieving greater compactness and greater reduction in weight even in cases in which a beam diameter is expanded in two directions by a first optical element and a second optical element.

According to a first aspect of the embodiment, a beam diameter expanding device includes a first optical element and a second optical element. The first optical element includes a first incident face provided at one end of the first optical element and a first emission face provided at another end of the first optical element. The first optical element expands a beam diameter of a light beam that has entered through the first incident face by expanding in a first direction, and emitting the expanded light beam from the first emission face. The second optical element includes a second incident face provided at one end of the second optical element and a second emission face provided at another end of the second optical element. The second optical element expands a beam diameter of the light beam that has entered through the second incident face in a state in which the beam diameter has been expanded in the first direction by the first optical element, by expanding in a second direction intersecting with the first direction, and emits the light beam from the second emission face. The beam diameter expanding device is configured such that a width of the first incident face in the second direction is narrower than a width of the second incident face in the first direction.

In the beam diameter expanding device, a beam diameter is expanded in the second direction after the beam diameter has been expanded in the first direction in the first optical element. This enables the beam diameter to be expanded in the first direction and in the second direction. In the first optical element, due to not expanding the beam diameter in the second direction, the range in the second direction through which the light beam passes is narrower than in the second optical element. Thus, the dimension of the first optical element in the second direction can be made smaller than the dimension of the second optical element in the first direction. This thereby enables greater compactness and reduced weight to be achieved in the first optical element. This in turn enables greater compactness and reduced weight to be achieved in the beam diameter expanding device.

In the beam diameter expanding device, the first optical element may have a stacked layer structure of light-transmissive layers and partially reflective layers alternately stacked along the first direction and disposed between reflection faces that face each other along the first direction, and the second optical element may have a stacked layer structure of light-transmissive layers and partially reflective layers alternately stacked along the second direction and disposed between reflection faces that face each other along the second direction. This thereby enables the beam diameter to be expanded in the direction in which the light-transmissive layers and the partially reflective layers are stacked.

In the beam diameter expanding device, a light blocking layer surrounding an emission region of the light beam may be provided to at least one of the first emission face or the second emission face. This enables the emission of stray light to be suppressed.

In the beam diameter expanding device, the first optical element may have a parallelogram profile in cross-section with the first incident face and the first emission face configured by inclined faces, and the second optical element may have a parallelogram profile in cross-section with the second incident face and the second emission face configured by inclined faces.

In the beam diameter expanding device, the first optical element may have a trapezoidal profile in cross-section with the first incident face and the first emission face configured by inclined faces, and the second optical element may have a trapezoidal profile in cross-section with the second incident face and the second emission face configured by inclined faces.

According to a second aspect of the embodiment, a display device includes the beam diameter expanding device according to the embodiment, a light source that emits the light beam, a scanning section, and a deflection member. The scanning section scans the light beam emitted from the light source by scanning in the first direction and the second direction to form an image. The deflection member deflects the light beam scanned by the scanning section so as to cause the light beam to be incident on an eye of a user. The beam diameter expanding device is disposed on a light path between the light source and the deflection member. Including the deflection member that deflects light scanned by the scanning section enables such a display device to be employed as a retinal scanning type of projection-type display device. In such cases also, the beam diameter is expanded in two directions intersecting each other and made incident on an eye of a user by the beam diameter expanding device, enabling the light beam to be caused to enter through the pupil of the eye even if the position of the eye is misaligned.

In the display device, the beam diameter expanding device may be disposed on a light path between the scanning section and the deflection member, and the scanning section may be configured such that a scanning range in the first direction for the light beam is wider than a scanning range in the second direction. This enables the dimension of the first optical element in the second direction to be made smaller than the dimension of the second optical element in the first direction, thereby enabling greater compactness and reduced weight to be achieved in the beam diameter expanding device.

In the display device, the scanning section may define an angle of view in a horizontal direction of the image by the scanning range in the first direction, and may define an angle of view in a vertical direction of the image by the scanning range in the second direction.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Figure 1:
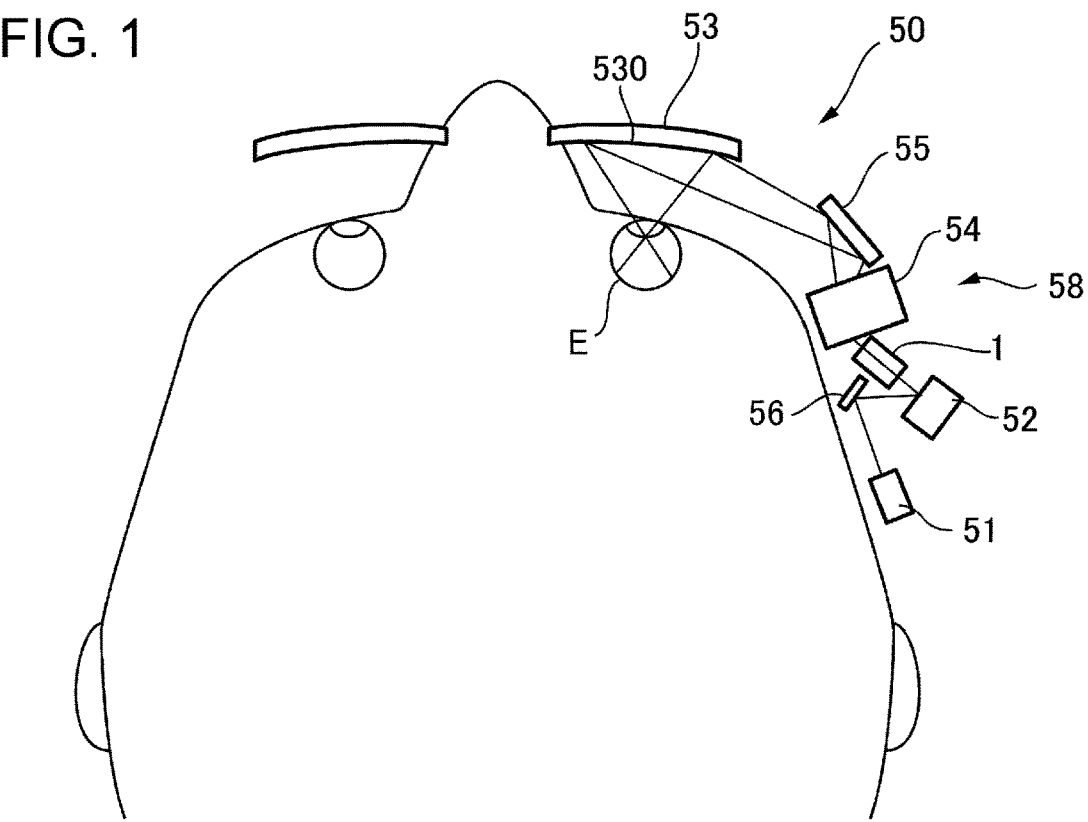
FIG. 1 is an explanatory diagram illustrating an aspect of a display device employing a beam diameter expanding device applied with the embodiment.

Explanation follows regarding embodiments. Note that in the drawings to be referenced in the following explanation, the number and scaling of each layer and each member is changed so that each layer and each member is enlarged enough to be seen on the drawing page.

First Embodiment

Example of Display Device Configuration

Figure 2:
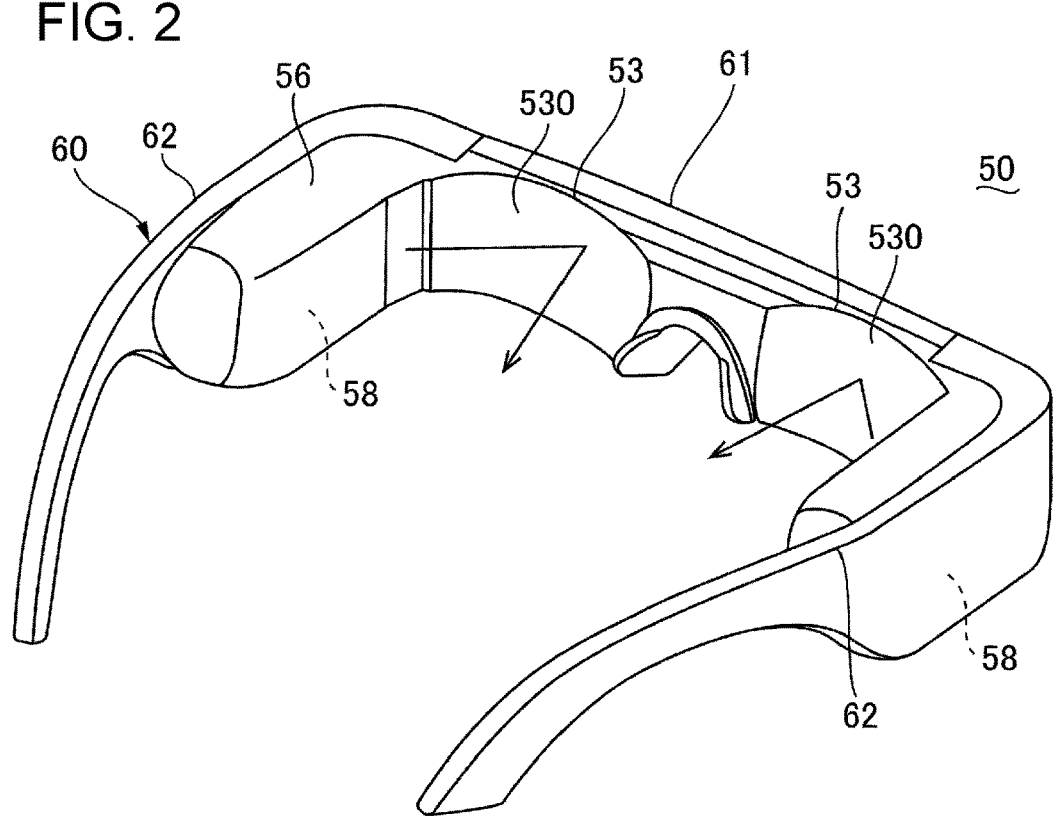
FIG. 2 is an explanatory diagram of an optical system of the display device illustrated in FIG. 1.

FIG. 1 is an explanatory diagram illustrating an aspect of a display device 50 employing a beam diameter expanding device 1 applied with the embodiment. FIG. 2 is an explanatory diagram of an optical system of the display device illustrated in FIG. 1. The display device 50 illustrated in FIG. 1 includes a light source 51 that emits light for image display, a scanning section 52 that scans light emitted from the light source 51, and a deflection member 53 that deflects light scanned by the scanning section 52 and makes the deflected light incident on an eye E of a user. In the present embodiment, the light beam emitted from the light source 51 is illuminated onto the scanning section 52 by a mirror 56. The display device 50 of the present embodiment also includes a lens system 54 such as a relay lens system, a projection lens system, or the like on the emission side of the scanning section 52, and a mirror 55 that reflects the light beam emitted from the lens system 54 toward the deflection member 53. A beam diameter expanding device 1, described later, is disposed on a light path from the light source 51 to the deflection member 53. In the present embodiment, the beam diameter expanding device 1 is disposed on a light path from the scanning section 52 to the deflection member 53. More specifically, the beam diameter expanding device 1 is disposed on a light path from the scanning section 52 to the lens system 54. The light source 51 includes, for example, a red laser element that emits red light, a green laser element that emits green light, and a blue laser element that emits blue light. The light source 51 also includes a half mirror or the like to combine light paths of these laser elements. Under control of a controller (not illustrated in the drawings), the red laser element, the green laser element, and the blue laser element emit modulated light beams at a light intensity corresponding to each dot on an image to be displayed.

The scanning section 52 scans incident light in two directions, corresponding to the widthwise direction and the heightwise direction of the image. The scanned light is projected onto the deflection member 53 via the lens system 54 or the like. The scanning section 52 may be realized by a micro mirror device formed by utilizing micro electro mechanical systems (MEMS) employing, for example, a silicon substrate. In such cases, the scanning section 52 may employ a configuration that uses a single scanning mechanism to scan incident light in the two directions corresponding to the widthwise direction and the heightwise direction of the image. The scanning section 52 may also be configured by a first scanning mechanism to scan incident light in one direction out of the two directions corresponding to the widthwise direction and the heightwise direction, and a second scanning mechanism to scan incident light in the other of the two directions corresponding to the horizontal direction and the vertical direction. The scanning section 52 may also scan incident light in predetermined directions under control of the controller (not illustrated in the drawings).

In the present embodiment, the display device 50 is configured as a retinal scanning projection-type of display device. The deflection member 53 has a deflection face 530 to deflect projected light and make the deflected light incident on the eye E of a user. In such a display device (retinal scanning projection-type display device), modulated light scanned in two directions by the scanning section 52 is reflected by the deflection face 530 of the deflection member 53, and arrives at the retina through the pupil so as to make an image visible to the user. In the present embodiment, the deflection member 53 is a partially transmissive combiner configured from a holographic element or the like. Thus, due to external light also being incident on the eye via the deflection member 53 (the combiner), an image in which the image formed by the display device 50 and external light (the background) are overlaid can be made visible to the user. Namely, the display device 50 is configured as a see-through retinal scanning type of projection device.

In the display device 50 configured in this manner, in the present embodiment the beam diameter expanding device 1 is disposed on the light path from the light source 51 to the deflection member 53. Thus, even if the position of the eye E changes, the image can be made visible to the user as long as the eye E is positioned within the range of beam diameter expanded by the beam diameter expanding device 1.

When the display device 50 configured in this manner configures a see-through head mounted display (eyeglass display), the display device 50 is formed in a shape like that of glasses, as illustrated in FIG. 2. When modulated light is to be made incident on each of the left and right eyes E of an observer, the display device 50 includes a frame 60 to support the deflection member 53 for the left eye and the deflection member 53 for the right eye at a front section 61, and optical units 58 including the optical components described with reference to FIG. 1 are provided at each of left and right temples 62 of the frame 60. In this case, all of the light source 51, the scanning section 52, the lens system 54, the mirrors 55, 56, and the beam diameter expanding device 1 may be provided to the optical units 58. Alternatively, configuration may be made such that just the scanning section 52, the lens system 54, the mirrors 55, 56, and the beam diameter expanding device 1 are provided to the optical units 58, and the optical units 58 and the light source 51 are connected together by an optical cable or the like.

Example of Beam Diameter Expanding Device 1 Configuration

Figure 3:
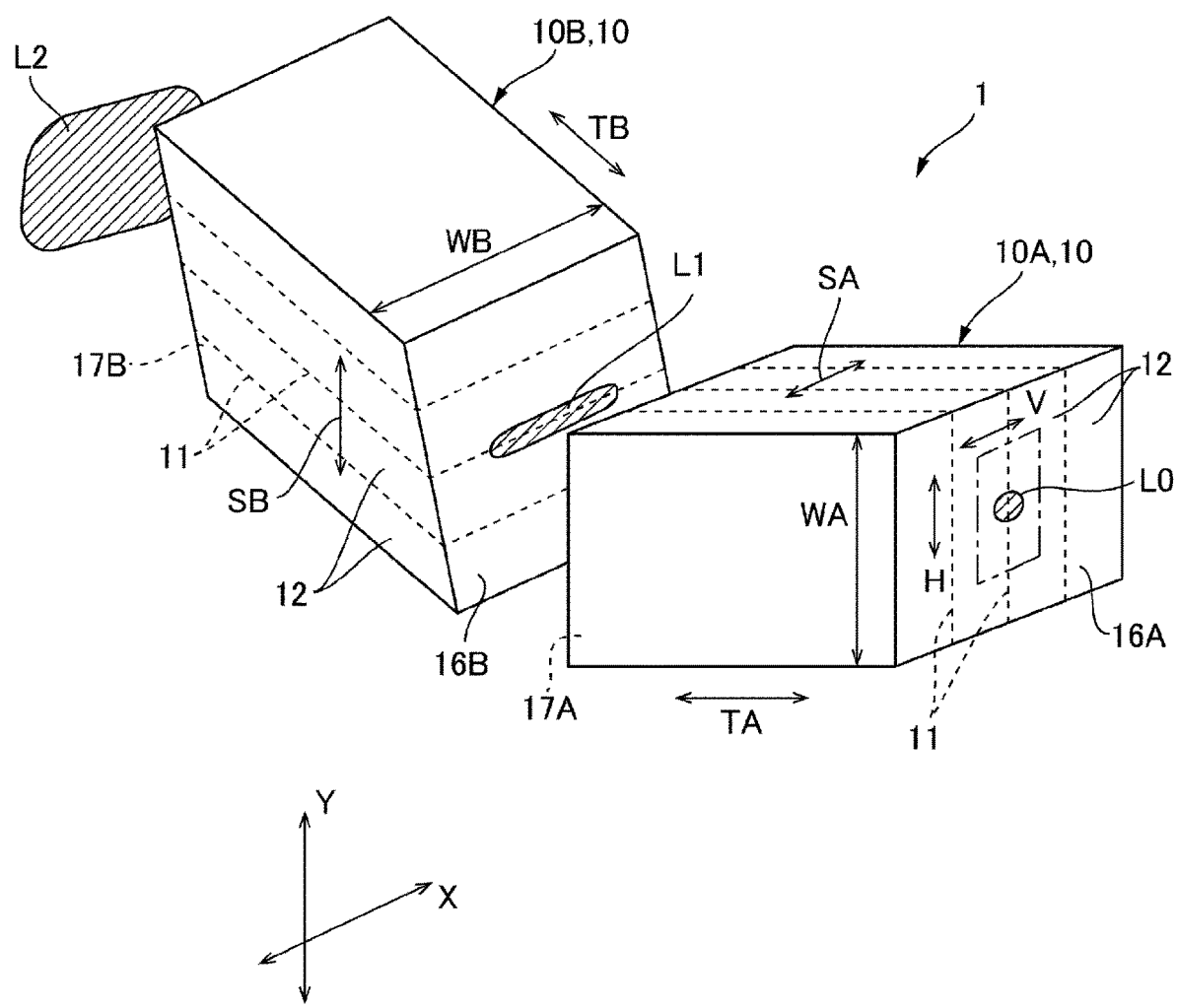
FIG. 3 is a perspective view schematically illustrating an aspect of a beam diameter expanding device according to a first embodiment.
Figure 4:
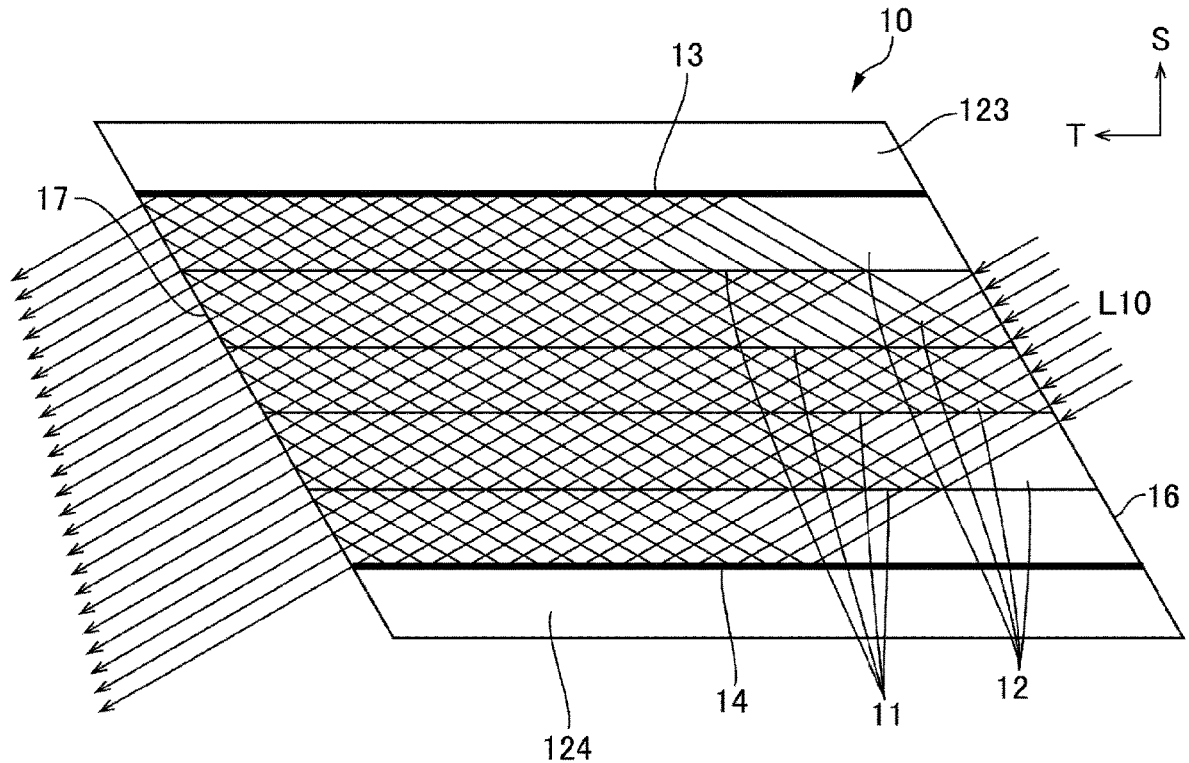
FIG. 4 is an explanatory diagram schematically illustrating a cross-section of an optical element employed as a first optical element and a second optical element illustrated in FIG. 3.

FIG. 3 is a perspective view schematically illustrating an aspect of the beam diameter expanding device 1 according to the first embodiment. FIG. 4 is an explanatory diagram schematically illustrating a cross-section of an optical element 10 employed as a first optical element 10A and a second optical element 10B illustrated in FIG. 3. Note that although the number of layers of light-transmissive layers 12 is illustrated as five layers in FIG. 4, in reality, there are, for example, about ten stacked layers of the light-transmissive layers 12. Moreover, the lines of light reflected at an emission face 17 are omitted from illustration in FIG. 4. Partially reflective layers 11 are also illustrated in FIG. 3 as dashed lines in order to indicate the stacking direction of the light-transmissive layers 12 and the partially reflective layers 11.

In the following description, a stacking direction S means a direction orthogonal to the light-transmissive layers 12 and the partially reflective layers 11 irrespective of the external profiles of the first optical element 10A and the second optical element 10B. Thus, a first direction X in which the first optical element 10A expands the beam diameter is a direction parallel to a stacking direction SA of the light-transmissive layers 12 and the partially reflective layers 11 in the first optical element 10A, and a second direction Y in which the second optical element 10B expands the beam diameter is a direction parallel to a stacking direction SB that is orthogonal to the stacking direction SA of the light-transmissive layers 12 and the partially reflective layers 11 in the first optical element 10A.

As illustrated in FIG. 3, the beam diameter expanding device 1 of the present embodiment includes the first optical element 10A having a first incident face 16A provided at one end of the first optical element 10A and a first emission face 17A provided at another end of the first optical element 10A, and the second optical element 10B having a second incident face 16B provided at one end of the second optical element 10B and a second emission face 17B provided at another end of the second optical element 10B. The first optical element 10A expands the beam diameter of the light beam entering through the first incident face 16A by expanding in the first direction X, and then emits the expanded light beam from the first emission face 17A. The second optical element 10B expands the beam diameter of the light beam that is entering from the second incident face 16B and has a state of beam diameter expanded in the first direction X by the first optical element 10A, by expanding the beam diameter in the second direction Y intersecting the first direction X, and then emits the expanded light beam from the second emission face 17B.

One of the first direction X or the second direction Y corresponds to a first scanning direction in the scanning section 52 illustrated in FIG. 1 (the widthwise direction H of images), and the other out of the first direction X or the second direction Y corresponds to a second scanning direction in the scanning section 52 (the heightwise direction V of images). In the present embodiment, the first direction X corresponds to the heightwise direction V, and the second direction Y corresponds to the widthwise direction H, and the ratio (an aspect ratio) of the dimension in the widthwise direction H to the dimension in the heightwise direction V is 16:9. Namely, the scanning section 52 defines the angle of view in the widthwise direction H (horizontal direction) of images by the scanning range in the second direction Y, and defines the angle of view in the heightwise direction V (vertical direction) of images by the scanning range in the first direction X.

The first optical element 10A and the second optical element 10B are each configured by the optical element 10 illustrated in FIG. 4. In FIG. 4, the optical element 10 has a stacked layer structure in which the light-transmissive layers 12 and the partially reflective layers 11 are alternately stacked between a first reflection face 13 and a second reflection face 14 such that there are light-transmissive layers 12 positioned at the two ends. The optical element 10 expands the beam diameter in the stacking direction S of the light-transmissive layers 12 and the partially reflective layers 11. In the optical element 10, the first reflection face 13, the second reflection face 14, and the partially reflective layers 11 are parallel to each other, and the thicknesses of the plural light-transmissive layers 12 are the same as each other. Thus, the separation between the first reflection face 13 and the partially reflective layer 11 adjacent thereto in the stacking direction S, the separation between the second reflection face 14 and the partially reflective layer 11 adjacent thereto in the stacking direction S, and the separation between the partially reflective layers 11 adjacent to each other in the stacking direction S, are all equal to one another. Moreover, in the optical element 10, the thicknesses of the plural partially reflective layers 11 are equal to each other. Note that light-transmissive protection substrates 123, 124 are stacked at the two sides of the optical element 10 in the stacking direction S.

In the present embodiment, the light-transmissive layers 12 are configured by substrates, such as glass substrates or quartz substrates, and by light-transmissive adhesive layers (not illustrated in the drawings). The first reflection face 13 and the second reflection face 14 are configured by an interface where a vacuum-deposited reflective metal film, such as of aluminum, contacts the light-transmissive layers 12. Note that the first reflection face 13 and the second reflection face 14 may be reflection faces employing differences in refractive index according to Snell's law.

The partially reflective layers 11 are configured from dielectric multilayer films of alternately stacked dielectric films of low dielectric constant and dielectric films of high dielectric constant, selected from inorganic films, such as silicon dioxide ($SiO_2$), titanium dioxide ($TiO_2$), alumina ($Al_2O_3$), calcium fluoride ($CaF_2$), magnesium fluoride ($MgF_2$), zinc sulfide (ZnS), and zirconium dioxide ($ZrO_2$). In the present embodiment, the dielectric multilayer films of the partially reflective layers 11 are configured by alternately stacking layers of $SiO_2$ and $TiO_2$ using vacuum deposition.

The optical element 10 includes an incident face 16 at one end of the optical element 10 in a length direction T intersecting with the stacking direction S, and an emission face 17 at another end of the optical element 10. The incident face 16 accordingly configures an end face facing toward one side of the optical element 10 in the length direction T, and the first emission face 17 configures an end face facing toward the other side of the optical element 10 in the length direction T. The optical element 10 of the present embodiment has a parallelogram profile in cross-section with the incident face 16 and the first emission face 17 configured by parallel inclined faces.

In the optical element 10 configured as described above, when light beam L10 from a direction inclined with reference to the stacking direction S is incident in a parallel light beam state on the incident face 16, the light beam L10 propagates in the length direction T while being repeatedly reflected by the first reflection face 13, reflected by the second reflection face 14, transmitted by the partially reflective layers 11, and reflected by the partially reflective layers 11. The light beam L10 is then emitted in a direction inclined with respect to the stacking direction S from the first emission face 17 in a state that remains a parallel light beam and has a beam diameter expanded in the stacking direction S.

Thus, the first optical element 10A illustrated in FIG. 3 has the stacked layer structure of the light-transmissive layers 12 and the partially reflective layers 11 alternately stacked in the first direction X between the first reflection face 13 and the second reflection face 14 that face each other in the first direction X, and has the first incident face 16A and the first emission face 17A at the respective two ends of the first optical element 10A in the length direction TA. The first optical element 10A accordingly expands the light beam entering from the first incident face 16A by expanding the light beam in the stacking direction SA of the light-transmissive layers 12 and the partially reflective layers 11 (in the first direction X) and emits the expanded light beam from the first emission face 17A. Moreover, the second optical element 10B illustrated in FIG. 3 has a stacked layer structure of the light-transmissive layers 12 and the partially reflective layers 11 alternately stacked in the second direction Y between the first reflection face 13 and the second reflection face 14 that face each other in the second direction Y, and has the second incident face 16B and the second emission face 17B at the respective two ends of the second optical element 10B in the length direction TB. The second optical element 10B accordingly expands the light beam entering from the second incident face 16B by expanding the light beam in the stacking direction SB of the light-transmissive layers 12 and the partially reflective layers (in the second direction Y) and emits the expanded light beam from the second emission face 17B. The first emission face 17A of the first optical element 10A and the second incident face 16B of the second optical element 10B face each other across a gap.

In the beam diameter expanding device 1 configured in this manner, in the first optical element 10A, when a light beam L0 from a direction inclined with respect to the first direction X is incident perpendicularly onto the first incident face 16A in a parallel light beam state, the light beam L0 propagates along the length direction TA of the first optical element 10A, and the light beam L0 is emitted perpendicularly from the first emission face 17A as the light beam L1 remaining in a parallel light beam state and having a beam diameter expanded in the first direction X. Note that representation of the light beam L1 depicted in the drawings corresponds to one in which a particular brightness is selected and this selected brightness is depicted. Namely, depending on where selection is made in the brightness distribution, the light beam L1 after being expanded either mutually overlaps as an elliptical shape as illustrated in FIG. 3, or is transformed into circles side-by-side in the X direction. In the present specification, when there is an assumption that the light after being expanded overlaps, then the width of the light after being expanded is referred to as the "beam diameter", but a pattern of narrow beams side-by-side is treated as a bundle, and sometimes the dimension from one end of the bundle to the other is referred to as "width".

Then, in the second optical element 10B, when the light beam L1 from a direction inclined with respect to the second direction Y is incident perpendicularly onto the second incident face 16B in a parallel light beam state, the light beam L1 propagates along the length direction TB of the second optical element 10B, and is emitted perpendicularly from the second emission face 17B in a state remaining as a parallel light beam and having a beam diameter expanded in the second direction Y. As a result, a light beam L2 is emitted from the second emission face 17B having a beam diameter of the light beam L0 expanded in the first direction X and the second direction Y. Note that the representation of the light beam L2 depicted in the drawings corresponds to one in which a particular brightness is selected and the selected brightness is depicted. Namely, depending on where selection is made in the brightness distribution, the light beam L2 after being expanded either mutually overlaps as an elliptical shape as illustrated in FIG. 3, or is transformed into circles side-by-side in the X direction. In the present specification, when there is an assumption that the light after being expanded overlaps, then the width of the light after being expanded is referred to as the "beam diameter", but a pattern of narrow beams side-by-side is treated as a bundle, and sometimes the dimension from one end of the bundle to the other is referred to as "width".

Size of First Optical Element 10A and Second Optical Element 10B

Figure 5:
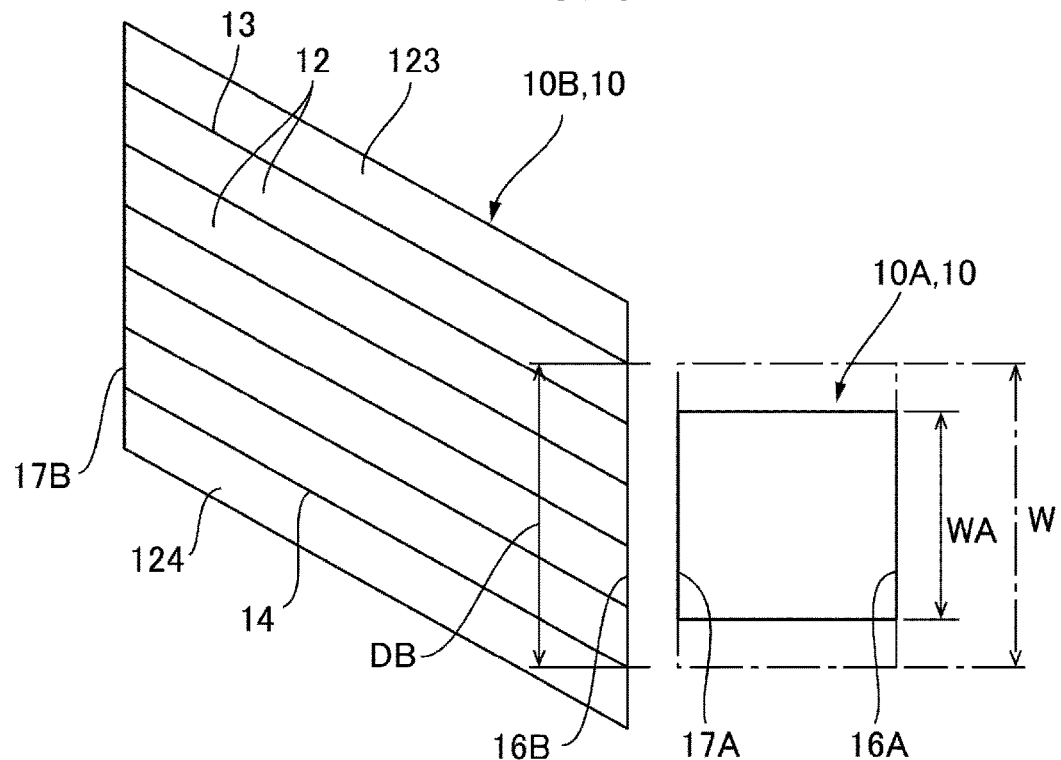
FIG. 5 is an explanatory diagram illustrating a width of a first incident face of the first optical element illustrated in FIG. 3.

FIG. 5 is an explanatory diagram illustrating a width of the first incident face 16A of the first optical element 10A illustrated in FIG. 3. With regard to the beam diameter expanding device 1 of the present embodiment, hitherto the first optical element 10A and the second optical element 10B employed would have had the same size as each other, with the width of the first incident face 16A in the second direction Y (a direction orthogonal to the expansion direction of the beam diameter in the first optical element 10A) being the same as the width of the second incident face 16B in the first direction X (a direction orthogonal to the expansion direction of the beam diameter in the second optical element 10B). For example, as illustrated by the dashed lines in FIG. 5, hitherto a width W of the first incident face 16A and the first emission face 17A in the first direction X would have been the same as a separation DB in the second incident face 16B between the first reflection face 13 and the second reflection face 14.

In contrast thereto, in the beam diameter expanding device 1 of the present embodiment, as illustrated in FIG. 3 and FIG. 5, a width WA of the first incident face 16A of the first optical element 10A in the second direction Y is narrower than a width WB of the second incident face 16B of the second optical element 10B in the first direction X. For example, as illustrated in FIG. 5, the width WA of the first incident face 16A and the first emission face 17A in the first direction X is narrower than the separation DB in the second incident face 16B between the first reflection face 13 and the second reflection face 14.

Principle Advantageous Effects of Present Embodiment

In the beam diameter expanding device 1 of the present embodiment configured in this manner, greater compactness and reduced weight can be achieved in the first optical element 10A due to the narrower width WA of the first incident face 16A of the first optical element 10A. This in turn enables the beam diameter expanding device 1 to achieve greater compactness and reduced weight.

For example, hitherto, in cases in which the first optical element 10A had a thickness of 4 mm, a length of 7.9 mm, and a width of 5.64 mm, the volume of the first optical element 10A would have been 178.2 mm$^3$. However, in the present embodiment, due to the first optical element 10A having a thickness of 4 mm, a length of 7.9 mm, and a width of 4.5 mm, the volume of the first optical element 10A is 142.2 mm$^3$. The present embodiment accordingly enables a 20.2% reduction to be achieved in the volume and weight of the first optical element 10A.

Even in such cases, due to not expanding the beam diameter in the second direction Y in the first optical element 10A, the range in the second direction Y of a light beam passing through the first optical element 10A is narrower than the range in the first direction X of a light beam passing through the second optical element 10B. Thus, the beam diameter can still be appropriately expanded in both the first direction X and the second direction Y even in cases in which the dimension of the first optical element 10A in the second direction Y is smaller than the dimension of the second optical element 10B in the first direction X.

Second Embodiment

Figure 6:
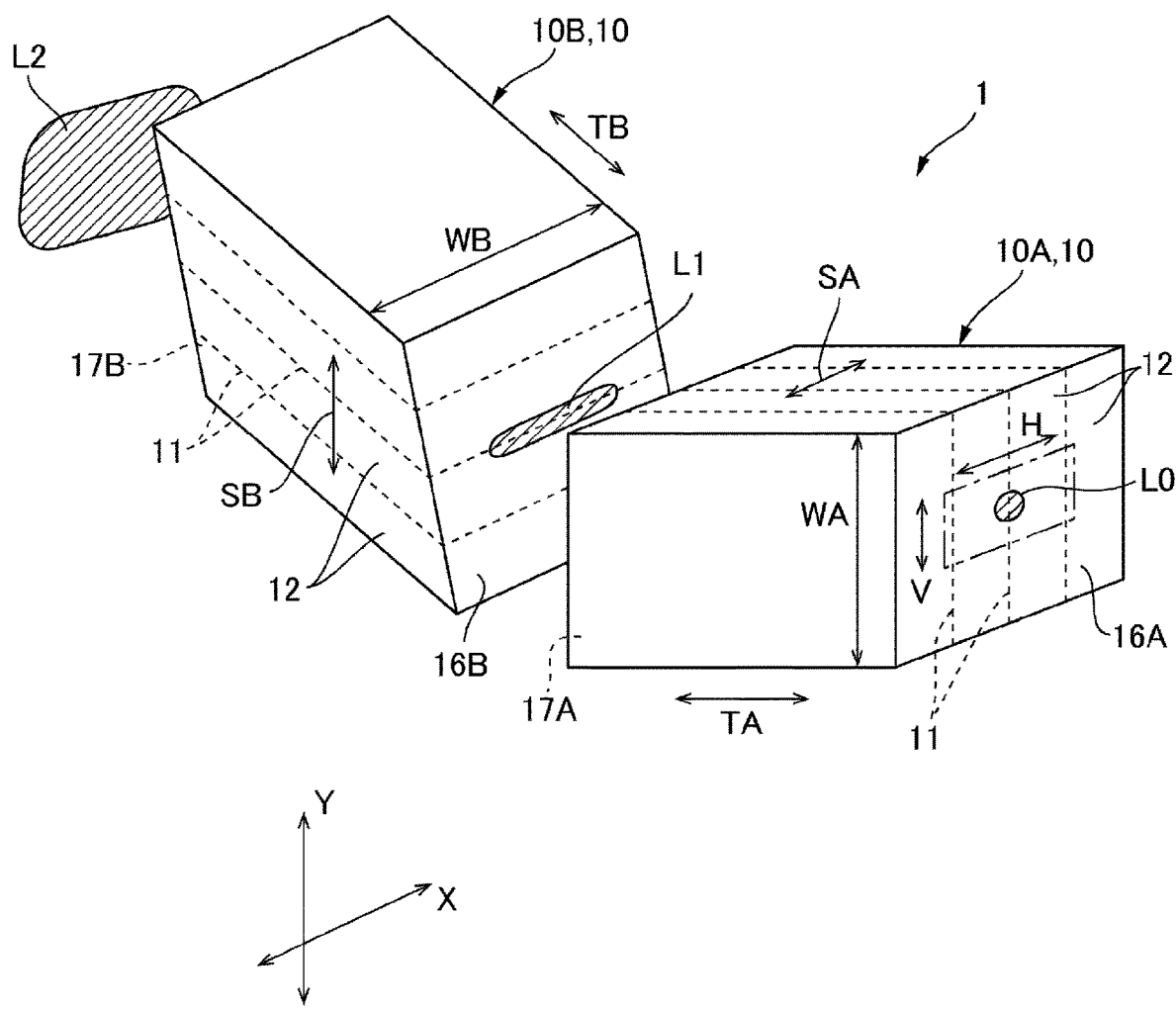
FIG. 6 is a perspective view schematically illustrating an aspect of a beam diameter expanding device according to a second embodiment.

FIG. 6 is a perspective view schematically illustrating an aspect of a beam diameter expanding device 1 according to a second embodiment. Note that due to the basic configuration of the present embodiment being similar to that of the first embodiment, in the drawings the same reference signs are appended to common portions, and explanation thereof is omitted.

In the first embodiment, the first direction X, this being the beam expansion direction by the first optical element 10A, is the heightwise direction V of images (the second scanning direction by the scanning section 52), and the second direction Y, this being the beam expansion direction by the second optical element 10B, is the widthwise direction H of images (the first scanning direction by the scanning section 52). In contrast thereto, in the present embodiment, as illustrated in FIG. 6, the first direction X, this being the beam expansion direction by the first optical element 10A, is the widthwise direction H of images (the first scanning direction by the scanning section 52), and the second direction Y, this being the beam expansion direction by the second optical element 10B, is the heightwise direction V of images (the second scanning direction by the scanning section 52). Namely, the scanning section 52 defines the angle of view in the widthwise direction (horizontal direction) of images by the scanning range in the first direction X, and defines the angle of view in the heightwise direction (vertical direction) of images by the scanning range in the second direction Y. In the present embodiment, a ratio (an aspect ratio) of the dimension in the widthwise direction H (the first direction X) to the dimension in the heightwise direction V (the second direction Y) in the scanning range by the scanning section 52 is 16:9.

Thus, the range in the second direction Y of the light beam passing through the first optical element 10A is narrower than that of the first embodiment. Thus in the present embodiment, the width WA of the first optical element 10A in the second direction Y can be made even smaller than the width WB of the second optical element 10B in the first direction X.

For example, hitherto, in cases in which the first optical element 10A had a thickness of 4 mm, a length of 7.9 mm, and a width of 5.64 mm, the volume of the first optical element 10A would have been 178.2 mm$^3$. However, in the present embodiment, due to the first optical element 10A having a thickness of 4 mm, a length of 7.9 mm, and a width of 2.68 mm, the volume of the first optical element 10A is 88.48 mm$^3$. The present embodiment accordingly enables a 50.3% reduction to be achieved in the volume and weight of the first optical element 10A.

Third Embodiment

Figure 7:
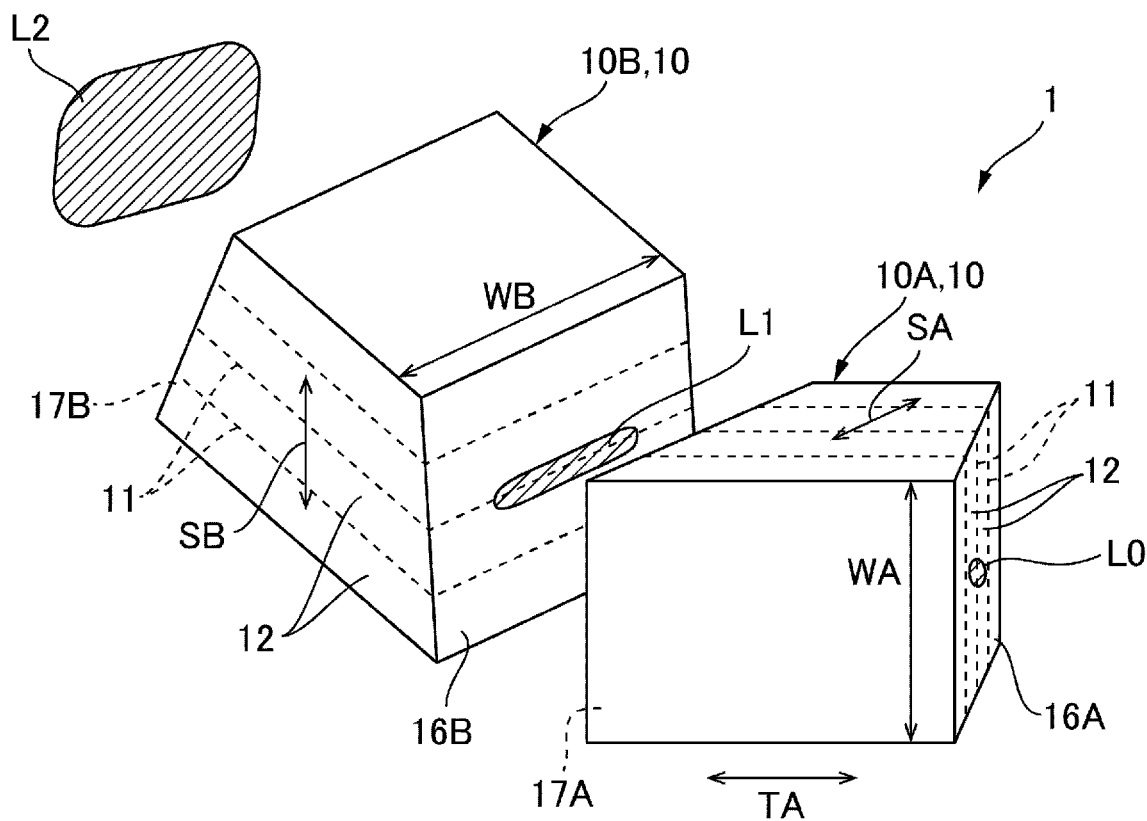
FIG. 7 is a perspective view schematically illustrating an aspect of a beam diameter expanding device according to a third embodiment.
Figure 8:
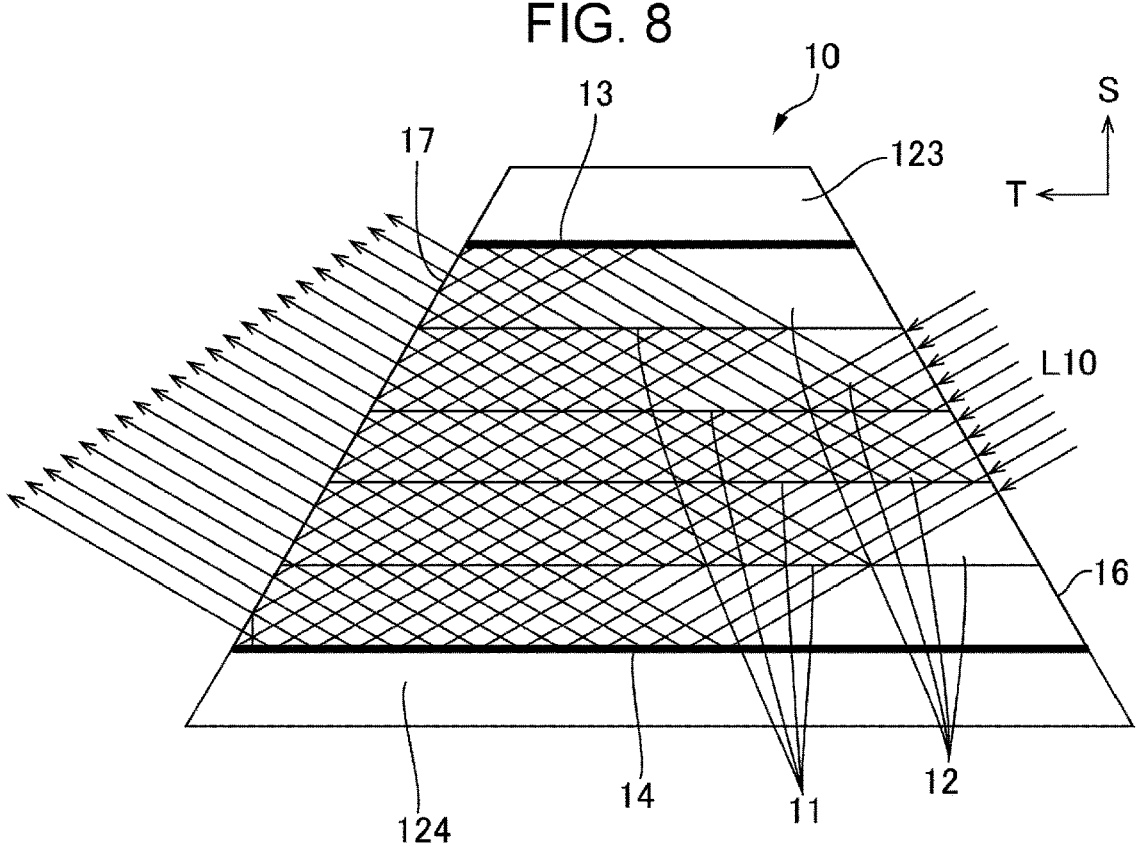
FIG. 8 is an explanatory diagram schematically illustrating a cross-section of an optical element employed as a first optical element and a second optical element illustrated in FIG. 7.

FIG. 7 is a perspective view schematically illustrating an aspect of a beam diameter expanding device 1 according to a third embodiment. FIG. 8 is an explanatory diagram schematically illustrating a cross-section of an optical element 10 employed as a first optical element 10A and a second optical element 10B illustrated in FIG. 7.

In the first and second embodiments, the first optical element 10A has a parallelogram profile in cross-section with the first incident face 16A and the first emission face 17A configured by inclined faces, and the second optical element 10B has a parallelogram profile in cross-section with the second incident face 16B and the second emission face 17B configured by inclined faces. In contrast thereto, in the present embodiment, as illustrated in FIG. 7, the first optical element 10A has a trapezoidal profile in cross-section with a first incident face 16A and a first emission face 17A configured by inclined faces, and the second optical element 10B has a trapezoidal profile in cross-section with a second incident face 16B and a second emission face 17B configured by inclined faces.

In the beam diameter expanding device 1 configured in this manner, the first optical element 10A and the second optical element 10B are configured by the optical element 10 illustrated in FIG. 8. The optical element 10 in FIG. 8 is configured by alternately stacking light-transmissive layers 12 and partially reflective layers 11, and the optical element 10 expands the beam diameter in the stacking direction S of the light-transmissive layers 12 and the partially reflective layers 11. Namely, when a light beam L10 from a direction inclined with reference to the stacking direction S is incident in a parallel light beam state on the incident face 16, the light beam L10 propagates in the length direction T while being repeatedly reflected by a first reflection face 13, reflected by a second reflection face 14, transmitted by the partially reflective layers 11, and reflected by the partially reflective layers 11. The light beam L10 is then emitted in a direction inclined with respect to the stacking direction S from the first emission face 17 in a state that remains a parallel light beam and has a beam diameter expanded in the stacking direction S.

In such a configuration too, as illustrated in FIG. 7, the width WA in the second direction Y of the first incident face 16A of the first optical element 10A is narrower than the width WB in the first direction X of the second incident face 16B of the second optical element 10B. For example, as illustrated in FIG. 5, the width WA in the first direction X of the first incident face 16A and the first emission face 17A is narrower than the separation DB in the second incident face 16B between the first reflection face 13 and the second reflection face 14. This thereby enables greater compactness and reduced weight to be achieved in the first optical element 10A, which in turn enables greater compactness and reduced weight to be achieved in the beam diameter expanding device 1.

Fourth Embodiment

Figure 9:
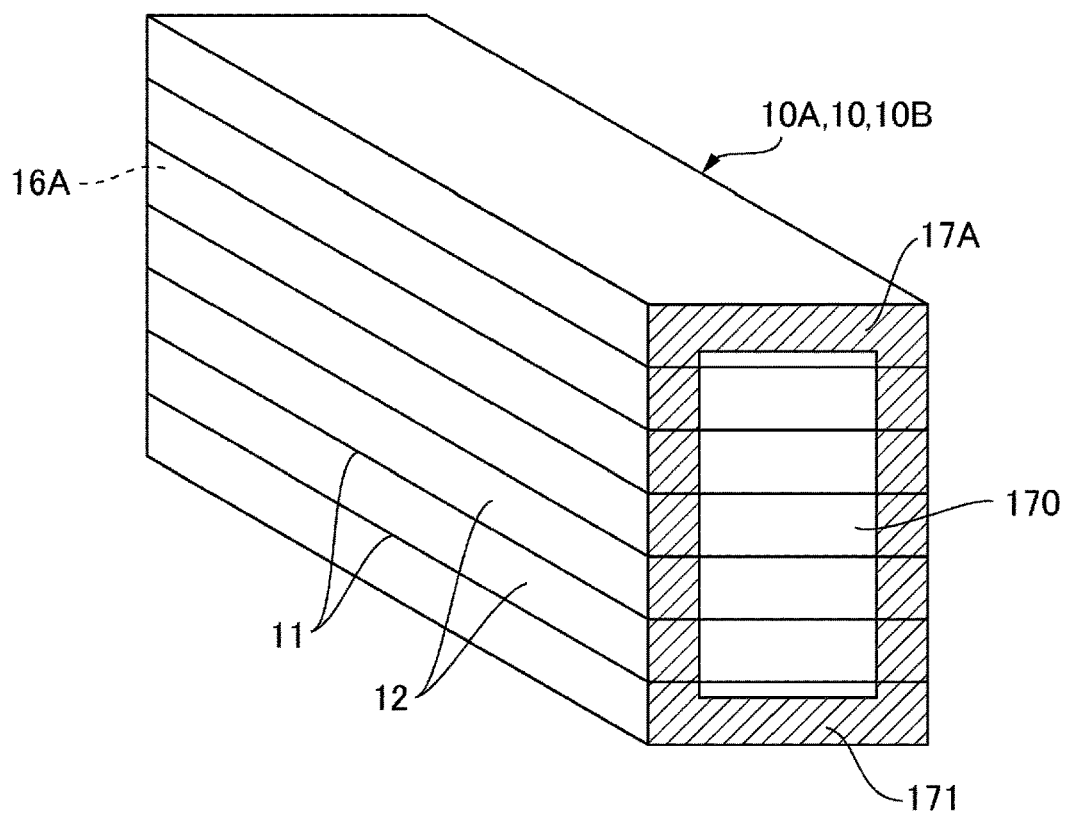
FIG. 9 is an explanatory diagram illustrating a first emission face of a first optical element employed in a beam diameter expanding device according to a fourth embodiment.

FIG. 9 is an explanatory diagram illustrating a first emission face 17A of a first optical element 10A employed in a beam diameter expanding device 1 according to a fourth embodiment. In the present embodiment, as illustrated in FIG. 9, a light blocking layer 171 is provided surrounding an emission region 170 of a light beam at the first emission face 17A of the first optical element 10A employed in the beam diameter expanding device 1. This enables the emission of stray light from the first emission face 17A of the first optical element 10A to be suppressed. Note that the light blocking layer 171 may also be provided surrounding an emission region 170 of a light beam at a second emission face 17B of a second optical element 10B. In such cases, the emission of stray light from the second emission face 17B of the second optical element 10B can also be suppressed.

Other Display Devices

In the above embodiments, light after modulation emitted from the light source 51 is scanned by the scanning section 52. However, a configuration may be adopted in which light prior to modulation emitted from the light source 51 is illuminated onto a liquid crystal panel while being scanned by the scanning section 52, and the modulated light emitted from the liquid crystal panel is then reflected by the deflection member 53.

In the above embodiments, the optical element 10 has either a parallelogram profile in cross-section or a trapezoidal profile in cross-section; however, the embodiment may also be applied to cases in which the optical element 10 has a rectangular profile.

In the above embodiments, the beam diameter expanding devices employed include a stacked layer body of the light-transmissive layers 12 and the partially reflective layers 11; however, the embodiment may be applied to cases in which beam diameter expanding devices that use a diffraction element are employed.

The entire disclosure of Japanese Patent Application No. 2016-186600, filed Sep. 26, 2016 is expressly incorporated by reference herein.

What is claimed is:

1. A beam diameter expanding device comprising:
a first optical element including a first incident face provided at one end of the first optical element and a first emission face provided at another end of the first optical element, the first emission face and the first incident face being separate from and opposed to each other, the first optical element expanding a beam diameter of a light beam that has entered through the first incident face by expanding in a first direction, and emitting the light beam from the first emission face; and a second optical element including a second incident face provided at one end of the second optical element and a second emission face provided at another end of the second optical element, the second emission face and the second incident face being separate from and opposed to each other, the second optical element expanding a beam diameter of the light beam that has entered through the second incident face in a state in which the beam diameter has been expanded in the first direction by the first optical element, by expanding in a second direction intersecting with the first direction, and emitting the light beam from the second emission face; and the beam diameter expanding device configured such that a width of the first incident face in the second direction is narrower than a width of the second incident face in the first direction, wherein the first optical element includes a first partially reflective layer having a first end and a second end that are separate from and opposed to each other in a length direction of the first optical element;

the first end of the first partially reflective layer intersects the first incident face;

the second end of the first partially reflective layer intersects the first emission face;

the second optical element includes a second partially reflective layer having a third end and a fourth end that are separate from and opposed to each other in a length direction of the second optical element;

the third end of the second reflective layer intersects the second incident face;

the fourth end of the second partially reflective layer intersects the second emission face;

when viewed from a direction parallel with the first partially reflective layer, the first incident face overlaps the first emission face; and when viewed from a direction parallel with the second partially reflective layer, the second incident face overlaps the second emission face.

2. The beam diameter expanding device according to claim 1, wherein:
the first optical element has a stacked layer structure of light-transmissive layers and partially reflective layers that includes the first partially reflective layer alternately stacked along the first direction and disposed between reflection faces that face each other along the first direction; and
the second optical element has a stacked layer structure of light-transmissive layers and partially reflective layers that includes the second partially reflective layer alternately stacked along the second direction and disposed between reflection faces that face each other along the second direction.

3. A display device comprising:
the beam diameter expanding device of claim 2;
a light source that emits the light beam;
a scanning section that scans the light beam emitted from the light source by scanning in the first direction and the second direction to form an image; and
a deflection member that deflects the light beam scanned by the scanning section so as to cause the light beam to be incident on an eye of a user;

the beam diameter expanding device being disposed on a light path between the light source and the deflection member.

4. The display device according to claim 3, wherein:
the beam diameter expanding device is disposed on a light path between the scanning section and the deflection member; and
the scanning section is configured such that a scanning range in the first direction for the light beam is wider than a scanning range in the second direction.

5. The display device according to claim 4, wherein the scanning section defines an angle of view in a horizontal direction of the image by the scanning range in the first direction, and defines an angle of view in a vertical direction of the image by the scanning range in the second direction.

6. The beam diameter expanding device according to claim 1, wherein a light blocking layer surrounding an emission region of the light beam is provided to at least one of the first emission face or the second emission face.

7. A display device comprising:
the beam diameter expanding device of claim 6;
a light source that emits the light beam;
a scanning section that scans the light beam emitted from the light source by scanning in the first direction and the second direction to form an image; and
a deflection member that deflects the light beam scanned by the scanning section so as to cause the light beam to be incident on an eye of a user;
the beam diameter expanding device being disposed on a light path between the light source and the deflection member.

8. The beam diameter expanding device according to claim 1, wherein:
the first optical element has a parallelogram profile in cross-section with the first incident face and the first emission face configured by inclined faces; and
the second optical element has a parallelogram profile in cross-section with the second incident face and the second emission face configured by inclined faces.

9. A display device comprising:
the beam diameter expanding device of claim 8;
a light source that emits the light beam;
a scanning section that scans the light beam emitted from the light source by scanning in the first direction and the second direction to form an image; and
a deflection member that deflects the light beam scanned by the scanning section so as to cause the light beam to be incident on an eye of a user;
the beam diameter expanding device being disposed on a light path between the light source and the deflection member.

10. The display device according to claim 9, wherein:
the beam diameter expanding device is disposed on a light path between the scanning section and the deflection member; and
the scanning section is configured such that a scanning range in the first direction for the light beam is wider than a scanning range in the second direction.

11. The display device according to claim 10, wherein the scanning section defines an angle of view in a horizontal direction of the image by the scanning range in the first direction, and defines an angle of view in a vertical direction of the image by the scanning range in the second direction.

12. The beam diameter expanding device according to claim 1, wherein:
the first optical element has a trapezoidal profile in cross-section with the first incident face and the first emission face configured by inclined faces; and
the second optical element has a trapezoidal profile in cross-section with the second incident face and the second emission face configured by inclined faces.

13. A display device comprising:
the beam diameter expanding device of claim 12;
a light source that emits the light beam;
a scanning section that scans the light beam emitted from the light source by scanning in the first direction and the second direction to form an image; and
a deflection member that deflects the light beam scanned by the scanning section so as to cause the light beam to be incident on an eye of a user;
the beam diameter expanding device being disposed on a light path between the light source and the deflection member.

14. The display device according to claim 13, wherein:
the beam diameter expanding device is disposed on a light path between the scanning section and the deflection member; and
the scanning section is configured such that a scanning range in the first direction for the light beam is wider than a scanning range in the second direction.

15. The display device according to claim 14, wherein the scanning section defines an angle of view in a horizontal direction of the image by the scanning range in the first direction, and defines an angle of view in a vertical direction of the image by the scanning range in the second direction.

16. A display device comprising:
the beam diameter expanding device of claim 1;
a light source that emits the light beam;
a scanning section that scans the light beam emitted from the light source by scanning in the first direction and the second direction to form an image; and
a deflection member that deflects the light beam scanned by the scanning section so as to cause the light beam to be incident on an eye of a user;
the beam diameter expanding device being disposed on a light path between the light source and the deflection member.

17. The display device according to claim 16, wherein:
the beam diameter expanding device is disposed on a light path between the scanning section and the deflection member; and
the scanning section is configured such that a scanning range in the first direction for the light beam is wider than a scanning range in the second direction.

18. The display device according to claim 17, wherein the scanning section defines an angle of view in a horizontal direction of the image by the scanning range in the first direction, and defines an angle of view in a vertical direction of the image by the scanning range in the second direction.

19. The beam diameter expanding device according to claim 1, wherein
the first emission face of the first optical element and the second incident face of the second optical element face each other across a gap.

20. The beam diameter expanding device according to claim 1, wherein
the first direction intersects the direction parallel with the first partially reflective layer, and
the second direction intersects the first direction and the direction parallel with the second partially reflective layer.

* * * * *